(No Model.) 3 Sheets—Sheet 1.
W. WYAND.
OBSERVATION ROUNDABOUT.
No. 512,429. Patented Jan. 9, 1894.
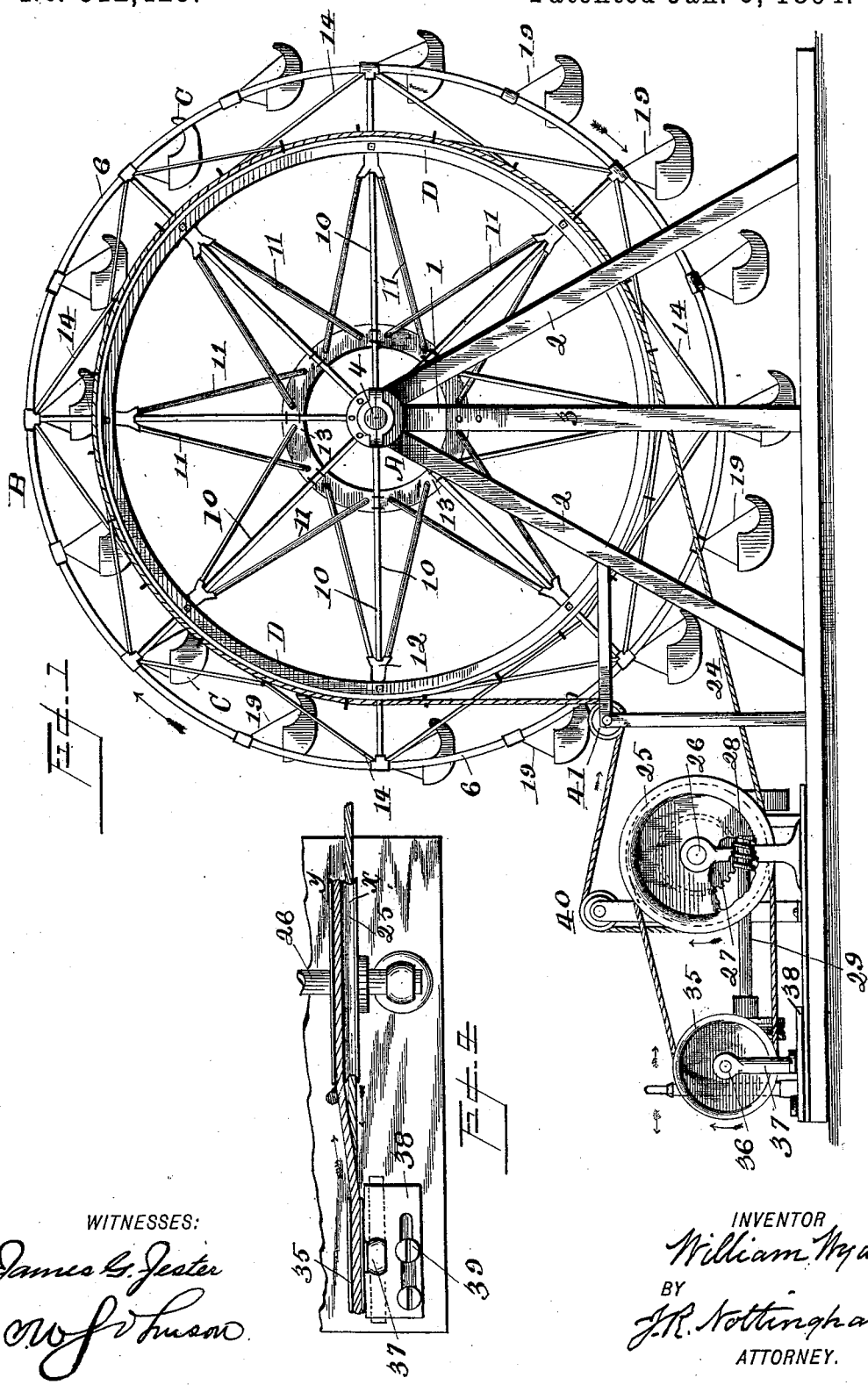
WITNESSES:
James G. Jester
O. W. Johnson
INVENTOR
William Wyand
BY
J. R. Nottingham
ATTORNEY.

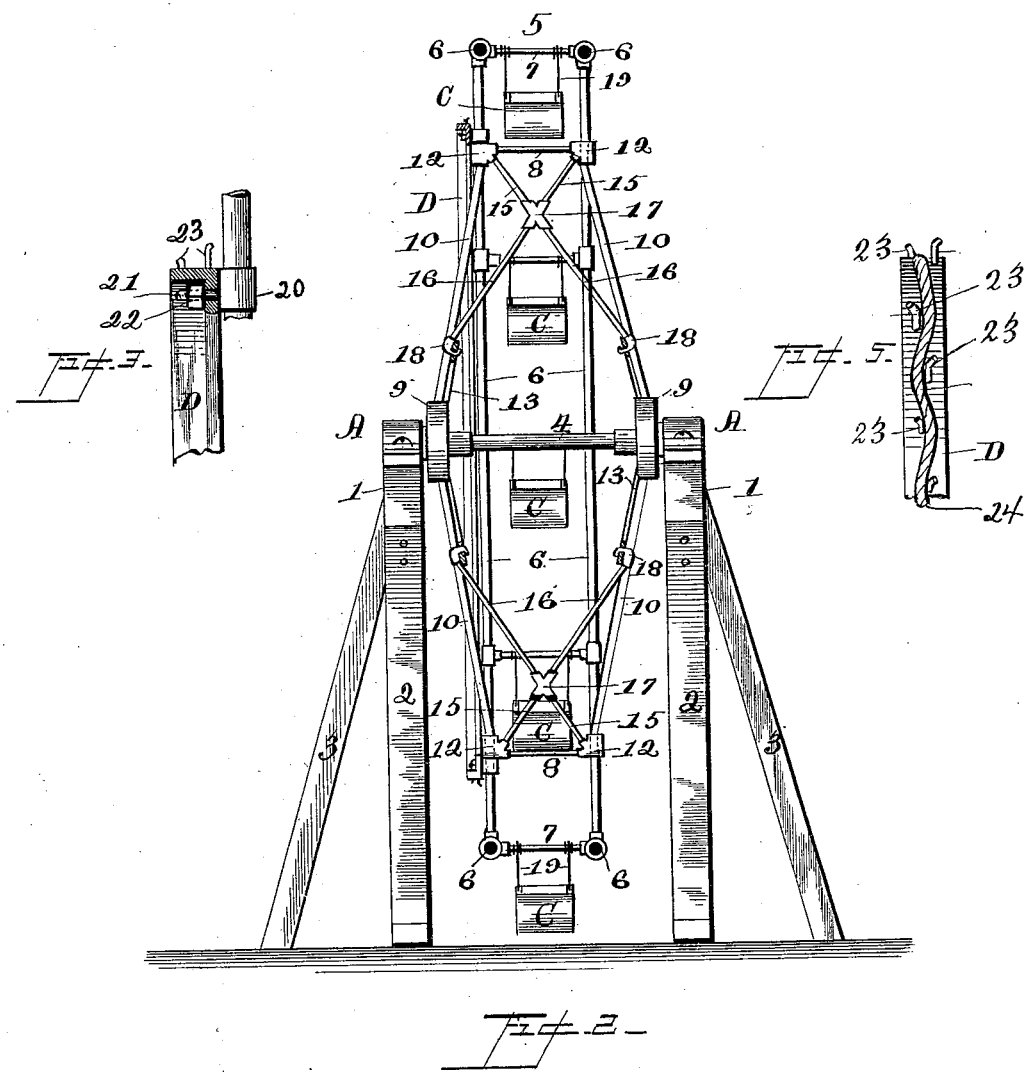

(No Model.) 3 Sheets—Sheet 3.
W. WYAND.
OBSERVATION ROUNDABOUT.
No. 512,429. Patented Jan. 9, 1894.
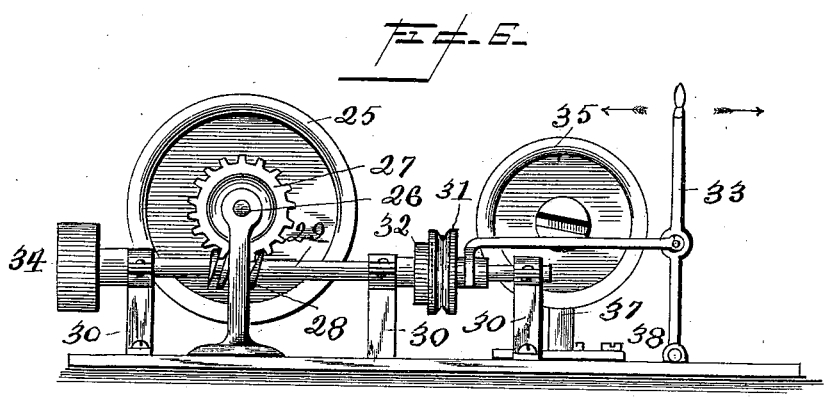
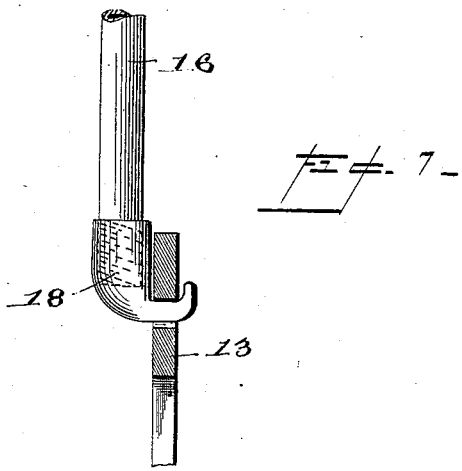
WITNESSES:
INVENTOR
William Wyand
BY
J. R. Nottingham
ATTORNEY.

UNITED STATES PATENT OFFICE.

WILLIAM WYAND, OF ATLANTIC CITY, NEW JERSEY.

OBSERVATION-ROUNDABOUT.

SPECIFICATION forming part of Letters Patent No. 512,429, dated January 9, 1894.

Application filed January 18, 1893. Serial No. 458,836. (No model.)

*To all whom it may concern:*

Be it known that I, WILLIAM WYAND, a citizen of the United States, residing at Atlantic City, in the county of Atlantic and State of New Jersey, have invented certain new and useful Improvements in Observation-Roundabouts; and I do hereby declare the following to be a full, clear, and exact description of the invention, such as will enable others skilled in the art to which it appertains to make and use the same.

My invention relates generally to certain new and useful improvements in that class of machines commonly called round-abouts or merry-go-rounds, but more particularly to the class known as observation-wheels; and it consists of a vertically mounted wheel provided with a multiplicity of carriages or cars, and means for rotating the wheel, as more fully hereinafter specified.

The objects of the invention are to provide a wheel of improved construction, one that shall be light and strong, and which, at the same time, can be easily driven, and also to provide means for operating the wheel whereby a steady motion is given thereto, and the wheel started and stopped without unpleasant jar.

The above stated objects are attained by the mechanism illustrated in the accompanying drawings, in which—

Figure 1 represents a side elevation of my improved machine complete; Fig. 2, a front elevation of the wheel and its supports, showing the flanged-annulus in vertical transverse section; Fig. 3, a section in detail view of the flanged-annulus and the means employed to secure it to the spokes of the wheel; Fig. 4, a top plan view of the driving mechanism; Fig. 5, a section of the driving-annulus, showing the serpentine or zig-zag running of the driving cable; Fig. 6, a side elevation of the driving mechanism; reverse to that shown in Fig. 1, and Fig. 7, a detail view of one of the connections between the annuli and the braces.

Referring to the drawings, similar reference letters and numerals indicate similar parts throughout the several views.

The letter A indicates the support for the wheel and may be constructed of any suitable material. In the present instance, the said support is represented as constructed of timber, and consists of two vertical standards 1 suitably mounted and strengthened against lateral strain by braces 2 and against endwise strain by braces 3.

The letters B indicate the wheel, which is mounted on the shaft 4 journaled in bearings at the upper ends of the support. The wheel is constructed principally of tubular metal, preferably gas-pipe, and periphery 5 being constructed of two parallel pipes or tubes 6, 6, suitably curved and properly connected in sections, and united at equi-distant intervals by means of cross-braces 7 and 8, which consist preferably, of short sections of pipe, as shown in Fig. 2.

The numeral 9 indicates the hubs of the wheel and consist of circular disks keyed or otherwise securely fastened to the shaft.

10 indicates the spokes, of gas-pipe, and are substantially of the form shown in Fig. 1, being bent so that each set on opposite sides will be parallel for a short distance at their outer ends, and then diverge outwardly to the hubs to which they are attached in any suitable manner. The parallel pipes or tubes, forming the periphery of the wheel, are centrally braced by means of stay-rods 11 which have their outer ends screwed into "fittings" 12 located at or near the ends of the spokes, and their inner ends connected to two annuli 13 located at opposite sides of the wheel and concentric with the hub thereof. The said braces diverge from their connecting points at the spokes, to each side thereof, forming as a whole an eight pointed star, as shown in Fig. 1. The periphery of the wheel is further braced by the rods 14 running from each alternate spoke fitting. The two sides of the wheel are interiorly braced by means of the rods 15 and 16. The outer ends of rods 15 are screwed into the fittings 12 and their inner ends into X-shape fittings 17, while the outer ends of rods 16 are screwed into "hooked" fittings 18 (see Figs. 1 and 7) and their inner ends into the X-shape fittings, see Fig. 2; it being understood that these rods are each cut with a right and left hand thread, and that the threads of the fittings 12 and 18 and the X-shape fittings are correspondingly cut.

The letter C indicates the carriages, which are constructed as usual in this class of machines and are swung from the cross-bars 7 of the wheel, by means of links 19, in such manner that they will always maintain a horizontally-vertical position as the wheel is rotated.

To one side of the wheel, is secured a flanged-annulus, D, constructed in sections, preferably of cast metal, and fastened to the spokes of the wheel, at or about the bends thereof, in any convenient manner. I prefer, however, to fasten the sections as shown in detail in Fig. 3 of the drawings, by means of the sleeves 20 oversetting the spokes and provided with screw-threaded extensions 21, the sections being provided with apertures for the reception of said extensions, said sections being confined thereon by means of screw-threaded binding nuts 22.

The flange of the annulus D is provided at intervals with hooked pins 23 set alternately out of line with each other, so that the driving-cable 24 will run in a serpentine or zigzag manner over the flange, and thus drive the wheel without any tendency to slip.

Number 25 indicates a driving pulley provided with two parallel grooves in its periphery. Said pulley is mounted on a shaft 26, which carries a cogged gear wheel 27, intermeshing with a worm 28 mounted on the driving shaft 29 journaled in suitable bearings in the standards 30 secured to the bed of the machine. The driving shaft is driven by any suitable motor connected by a band with the pulley 31, and is provided with an ordinary friction clutch 32, operated by a lever, 33, whereby the driving-mechanism can be started and stopped without stopping the motor. The driving-shaft is also provided with a balance-wheel, 34, to insure uniform motion.

The number 35 indicates a "tightener," which consists of a grooved wheel mounted on a shaft, 36, journaled in a bearing made in a standard, 37, supported from a base 38, suitably slotted to permit of adjustability by means of the set screws 39.

Numbers 40 and 41 indicate two "idler" pulleys, each journaled in suitable bearings and supported, respectively, from the bed of the driving-mechanism and the frame of the wheel support. The cable passes under the pulley 25 in groove $x$; thence under and over the tightener; thence over and around pulley 25 in groove $y$; thence up over the idler 40; thence under idler 41, and thence up and around the flanged-annulus in a serpentine manner, back to pulley 25.

The operation of my invention will be apparent from the above description. Motion being applied to the worm-shaft, is transferred to the double grooved driving pulley, through the medium of the worm-gearing, and thence to the carriage-carrying wheel, through the medium of the cable. By means of the clutch mechanism, the wheel can be started and stopped at will, independently of the engine.

It will be seen that the construction and arrangement of the entire machine are such that a perfectly steady and uniform motion of the wheel is insured, and that all tendency of the cable to slip is prevented.

Having thus fully described my invention, what I claim as new, and desire to secure by Letters Patent, is—

1. An observation wheel or roundabout comprising two hubs and two rims, each hub and its rim connected together by a series of spokes which incline inwardly from the hub for a portion of their length and for the remaining portion running in a parallel plane with the rim, the spokes of each hub and its rim, at or near their bends, connected together by cross-rods, and the rims connected at intervals by cross-rods, substantially as specified.

2. An observation wheel or roundabout, comprising two hubs and two rims, each hub and its rim connected together by spokes inclining inwardly from the hub for a portion of their length and for the remaining portion running in a parallel plane with the rim, two sets of cross-rods connecting the parallel portions together, an annulus on each side of the wheel, and stay-rods running from each annulus to the point of bend of the spokes, substantially as specified.

3. The combination, in an observation wheel or roundabout, of two parallel rims connected at intervals by cross-rods, the hubs, the spokes bent as described, and a cable-pulley consisting of a flanged annulus secured to one side of the wheel at a point at or near the bend of the spokes, and having a series of pins arranged on its periphery in a manner that will cause the cable to run in a tortuous course, substantially as described.

4. The combination, with the peripheral rims of the wheel united by cross-connections, and the spokes bent as described, of the cable pulley consisting of a flanged annulus secured to the spokes at the bends thereof, and having on its periphery staggered pins between which the cable is adapted to run, the annuli concentric with the hubs, and the braces connected to the spokes and to annuli, substantially as specified.

5. The combination, with the parallel peripheral rims of the wheel, the bent spokes and hubs thereof, the annuli and brace rods connecting the annuli with the spokes, and the interior cross-bracing, of the cable-pulley consisting of a flanged annulus having pins so arranged on its periphery that the cable will run in a tortuous manner, substantially as described.

6. The combination, with the carriage-conveying wheel having secured to one of its sides a cable-pulley consisting of a flanged annulus having a series of staggered pins arranged on its periphery as described, of a double grooved driving-pulley, a cable-tightener around which the cable runs, the cable, and a driving-gearing capable of being disconnected to cut off the power, substantially as specified.

In testimony whereof I affix my signature in the presence of two witnesses.

WILLIAM WYAND.

Witnesses:
JAMES G. JESTER,
J. R. NOTTINGHAM.